W. B. FEATHERSTONE.
ART OF RECORDING COLORS.
APPLICATION FILED NOV. 19, 1915.
1,209,420.   Patented Dec. 19, 1916.
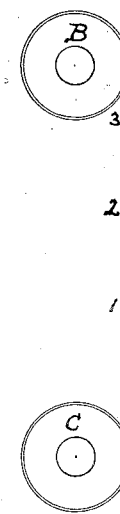
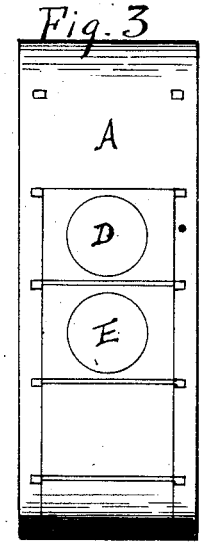
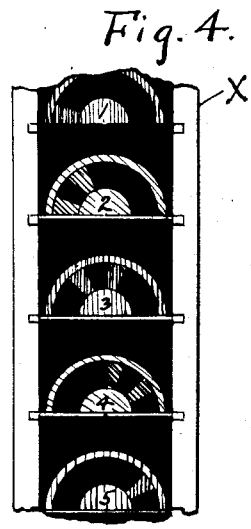
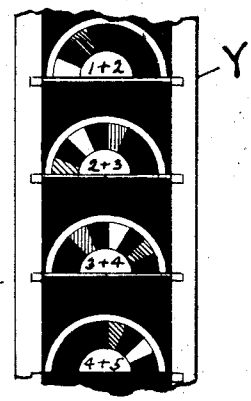
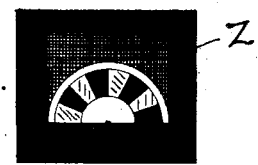
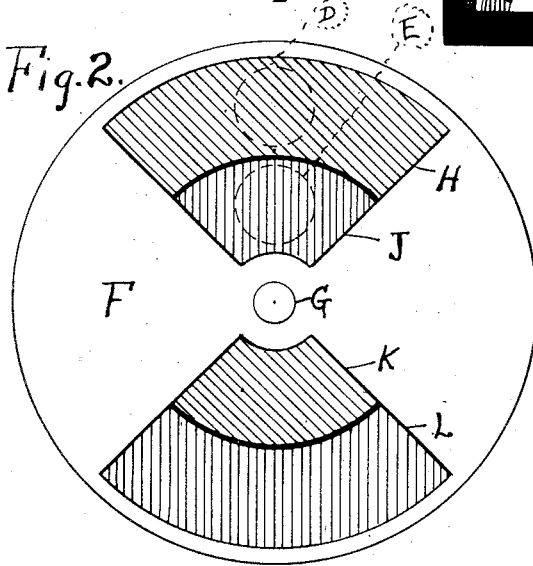
WITNESSES:
Howard B. Coles.
Lewis Bruce.
INVENTOR.
Willard B. Featherstone

UNITED STATES PATENT OFFICE.

WILLARD B. FEATHERSTONE, OF WASHINGTON, DISTRICT OF COLUMBIA.

ART OF RECORDING COLORS.

1,209,420.  Specification of Letters Patent.  Patented Dec. 19, 1916.

Application filed November 19, 1915. Serial No. 62,297.

*To all whom it may concern:*

Be it known that I, WILLARD B. FEATHERSTONE, a resident of Washington, in the District of Columbia, have invented certain new and useful Improvements in the Art of Recording Colors, of which the following is a specification.

My invention relates particularly to that type of motion picture camera which makes color records by exposing sensitive film alternately through differently colored light filters, and has for its object to make it possible to produce a negative, which, when printed, will give a positive capable of producing a much more satisfactory picture when projected upon a screen.

It has heretofore been customary, when using a twin-lens projector and superimposing two images upon a screen, to use a positive film which has been printed from a negative taken with a camera which had but one lens, and hence when two successive images were superimposed there would be lack of register wherever a fast moving object crossed the foreground. This causes so-called color fringes which are much more noticeable and objectionable than the gray fringes from the ordinary black and white films.

Another defect arising from superimposing separately recorded scenes is that an unreal appearance is caused by the very fact that each color has been recorded only in every other view, causing undue reliance on so-called persistence of vision.

I overcome these defects to a very satisfactory degree by employing a camera which has two or more lenses, according to the number of primary colors which are to be recorded. By this means each scene is recorded in each color, and each image area receives two exposures, which at present is another advantage as it insures ample timing whereas often a single exposure might be insufficient with ordinary panchromatic emulsions.

In the accompanying drawings I have illustrated one method of constructing such a camera, but inasmuch as the same results may be obtained by a different style of shutter, for example, I do not limit myself to this particular construction, nor to the use of two lenses, as any other number, ordinarily three may be used, but two are illustrated for the sake of simplicity.

Figure 1, is a side view of film, shutter and lenses, partly in section. Fig. 2, is a front view of the shutter. Fig. 3, is a front view of the film. Fig. 4, represents a piece of positive film printed from a negative of a revolving fly-wheel. Fig. 5, shows the result of superimposing projections from various images on X, Fig. 4. Fig. 6, shows the effect seen by a spectator, allowing for "persistence of vision". Fig. 7, shows the effect when the product of an ordinary camera, with single lens and red-and-green shutter, is printed and projected either singly or superimposed. Fig. 8, shows the effect of running the latter camera at double speed.

In Figs. 1, 2, and 3, A is the negative film-stock, which is being fed from reel B, and taken up on reel C. D, and E, are lenses at proper focal distance from the film. The shutter F, revolves on shaft G, and may be either in front of or behind the lenses. The shaft is connected by suitable gearing, not shown, so that it will revolve only half-way around each time that the film is advanced one picture distance. Thus in the position shown in Figs. 1, and 3, the color aperture H, is opposite lens D, while aperture J, is opposite lens E. Now while the film is standing still an image having red color values will be impressed upon the film at 1, while a "green" image will be taken at 2. The shutter now turns so that one of its dark portions will obscure both lenses, and the film will then travel just one picture-distance and come to a stop, whereupon the color apertures, K, and L, will come opposite the lenses E and D, respectively. Image-area 2, will have traveled to the place behind lens E, previously occupied by image-area 1, and will be exposed to the new scene, but through a similar green color filter, while image-area 3, is getting its first exposure through the red filter L. Then 3 will likewise advance one step and get another red exposure through the filter J, which will at that time have returned to the position first described. Hence alternate images record different color values, just as if one lens were used, but each area is exposed twice, once through the upper lens D, and again through lower lens E. Images 1, 3, 5, etc., will have red color values, and images 2, 4, 6, etc., will have green.

The positive print X, Fig. 4, is a record of a fly-wheel having one spoke with a narrow white stripe painted lengthwise upon it, with hub and rim also white but otherwise black, and revolving at the rate of 120 revolutions per minute while exposures are made at the rate of 16 per second. Thus four pictures are taken while the wheel turns half-way around.

Image 2, shows two blurred positions of the stripe, which will be less than half as bright as the rim and hub, but all will represent green color values. The rim and hub apparently stood still while the spoke advanced one eighth of the way around between the two exposures.

Image 3, taken twice through red filters, shows one spoke position the same as image 2, but of course the color values are red instead of green. Similarly image 4 shows one of its spoke positions the same as image 3, but in green color values, and so on throughout the length of the film.

Now if we project images 2, and 3, through two lenses arranged similarly to those of the camera, so that they will be superimposed upon a screen, the result will be a blended picture, like the one marked 2+3 in Y, Fig. 5. The rim and hub would be whitish, or so-called "two-color white," which for brevity we shall call white, and the middle position of the stripe will be white also, but its two other appearances will be one red and the other green. This is simply because the middle appearance is caused by the blending of those positions of the stripe which were similar in images 2, and 3, whereas the other positions, having no corresponding representation, are projected in a single color. This mode of projection apparently introduces an undue amount of fringe, there being a triple representation of fast moving objects, but the advantages are revealed when the images are advanced in rapid succession. It is then seen that neither a single image, nor two successive images comprise the actual effect on the spectators. It is rather the blend of from three to five images that constitutes the picture, for persistence of vision not only establishes continuity, as from one image to another, but carries over in lesser degree to several images. The result of this, together with the overlapping of certain positions of the fast moving foreground of each image upon the similar but differently colored parts of preceding or succeeding images, is that the fringes are not of the relatively harsh primary colors, but are more nearly a neutral gray (assuming the color of the part to be white) and therefore have the same general effect on the spectators that the black and white pictures do when projected in the usual way.

Of course no pleasing picture would result from photographing the flywheel device chosen for illustration, but in practice the whole of each spoke would be the same color, and the overlappings would cause a neutral gray blur all the way around.

In Fig. 6, Z represents roughly the screen appearance of the revolving fly-wheel photographed and printed as above, and projected at the rate of 16 images per second through a twin lens projector. The light shading of the spokes is intended to indicate that the alternate appearances are light red and light green, instead of the full colors which would appear if the negatives had had but a single exposure. The latter condition is shown in M, Fig. 7, which fairly represents the effect on the spectators when viewing either a single lens or a twin lens projection of images taken at the rate of 16 per second, in two colors, and with a single lens on the camera.

N, Fig. 8, shows the effect when the negatives were made with a single lens camera speeded up to 32 images per second. Practically the same effect would obtain whether the projecting machine had one or two lenses. In this case it will be noted that there are eight appearances of the spoke, of which four alternate ones are red and the others green. In fact this is just what would be observed if a so-called "cinema-color" camera were employed to photograph such a fly-wheel, and the effect, so far as the spoke is concerned, will not improve by putting twin lenses on the projector, although the still parts of the scene, represented here by the rim and hub, would then lack the "color flicker" common to all single lens color projectors.

The screen appearances in Fig. 5, (2+3 and 3+4) show in the middle a substantially white spoke with a red spoke on one side and a green spoke on the other. The dilution of these harsh colors into an inoffensive tint (Fig. 6) is not caused by overlapping spatially, but rather temporally, due to presistence of vision, and since a red is followed (temporally) by a white, and this in turn by a green, all three of which appearances are coextensive spatially, and impress the eye within the fifth part of a second, the actual impression in the mind of the observer at any given instant is that of a light yellowish green spoke followed and preceded by spokes of a pinkish cream tint. In other words, the screen would reveal a series of spokes, alternately tinted as in Fig. 6.

The advantages, then, of a twin lens camera for two-color cinematography, and three-lenses for three color work, are first, the substantial elimination of the startling color fringes which are unavoidable where one lens only is used. Second, each area of the negative is impressed from both lens positions, giving a roundness and partial relief to the projections. Third, each area receives a double exposure, thus making it possible to give the necessary time to scenes doubtfully illuminated.

Means for adjusting the lenses to correspond with the distances of the principal planes of the scene, and for simultaneously adjusting the separation of the lenses and their foci, are not shown, as they are well known to those skilled in the art.

It is possible to dispense with separate filtering devices by using colored celluloid as a base for the panchromatic emulsion and turning the celluloid side toward the lenses, in which case the shutter simply occults and exposes. Hence my invention is not limited to means including any particular type of filter, or shutter, or picture-surface or camera.

I claim:—

1. The art of recording colors which comprises making a series of photographic negatives representing successive aspects of a scene, each negative being the result of a plurality of exposures, substantially according to the following procedure; each image area is passed in succession into the focal fields of two or more lenses, each of which transmits, by virtue of shifting color filters, the same or similarly colored light to a given area, the next area receiving another color from each lens alike, each area receiving as many monochromatic exposures as there are lenses, while the areas are advanced one at a time between exposures.

2. A series of photographic negatives representing successive aspects of a scene, said negatives being arranged in a plurality of sub-series, each sub-series representing color values corresponding to one of the primary colors, and each negative being the result of a plurality of exposures, made each through a separate lens, each exposure representing an aspect of the scene slightly different from that represented by the other exposures blended with it.

3. A series of photographic negatives representing successive aspects of a scene, said negatives being arranged in a series of groups, the first negative of each group being limited in its representation to a single primary color or an approximation thereto, the second negative of each group being likewise limited to a different primary color, and the third, if any, to a still different color; each negative being a composite of a plurality of exposures made through a group of lenses equal in number to the number of negatives in a group, and spaced apart a like distance.

4. A cinematographic film comprising a series of photographs representing successive aspects of a scene, each photograph being a composite representation, from two or more slightly different viewpoints, of two or more successive aspects, every second or third photograph being limited in its representation to a single primary color or an approximation thereto, the intermediate photographs being likewise limited to another primary color or colors.

WILLARD B. FEATHERSTONE.

In presence of—
 HOWARD B. COLES,
 LEWIS BRUCE.